Sept. 27, 1966  E. J. KISLING  3,275,044
POWER DRIVEN MITER SAW
Filed May 15, 1964  3 Sheets-Sheet 1

EDWARD J. KISLING
INVENTOR

Huebner & Worrel
ATTORNEYS

Sept. 27, 1966  E. J. KISLING  3,275,044
POWER DRIVEN MITER SAW
Filed May 15, 1964  3 Sheets-Sheet 3

EDWARD J. KISLING
INVENTOR

Huebner & Worrel
ATTORNEYS

3,275,044
POWER DRIVEN MITER SAW
Edward J. Kisling, 4965 E. Tulare, Fresno, Calif.
Filed May 15, 1964, Ser. No. 367,741
4 Claims. (Cl. 143—6)

The present invention relates to a power driven miter saw and more particularly to such a saw having a rigidly mounted miter box thereon for constraining workpieces and a powered rotary saw blade which is quickly angularly adjustable relative to the miter box without disturbing workpieces thereon.

Conventional power driven miter saws usually provide a non-adjustable saw blade which requires that the miter box be angularly adjustable relative to the blade. Frequently, it is necessary to adjust the angularity of the miter box while a workpiece is in cutting position on the saw. Such adjustment is awkward and frequently impossible for a single workman, particularly when sawing workpieces of unusually long lengths. Such conventional miter saws also usually provide complicated linkages to raise and to lower the saw blades relative to their miter boxes and workpieces. They also require additional locking mechanisms to hold the saw blades in elevated positions when not in use. Such linkages and locking mechanisms present a source of trouble as they are subject to binding and to rapid wear which result in loosening of the linkages and inaccurate saw cuts. Furthermore, such operations create safety hazards to the operators and others in proximity.

Therefore, it is an object of the present invention to provide an improved power driven miter saw.

Another object is to provide such an improved power driven miter saw wherein the saw blade is capable of being adjusted to a variety of angular positions.

Another object is to provide a power driven miter saw of the character described which utilizes a rigidly mounted miter box for improved constrainment of workpieces thereon.

Another object is to provide a power driven miter saw wherein the saw blade is easily movable between adjusted angularly related positions and automatically held in such positions without additional locking operations.

Another object is to provide a power driven miter saw wherein the saw blade is automatically disposed in elevated position above the sawing area when not in use.

Another object is to provide a power driven miter saw which is compact, lightweight, easily manufactured and is operable with a minimum of hazard to the operator.

Other objects and advantages of the present invention will subsequently become more clearly apparent upon reference to the following description in the specification.

In the drawings:

FIG. 5 is a somewhat enlarged fragmentary vertical section through a saw arm support assembly of the miter saw taken on line 5—5 of FIG. 4.

Figure 1:
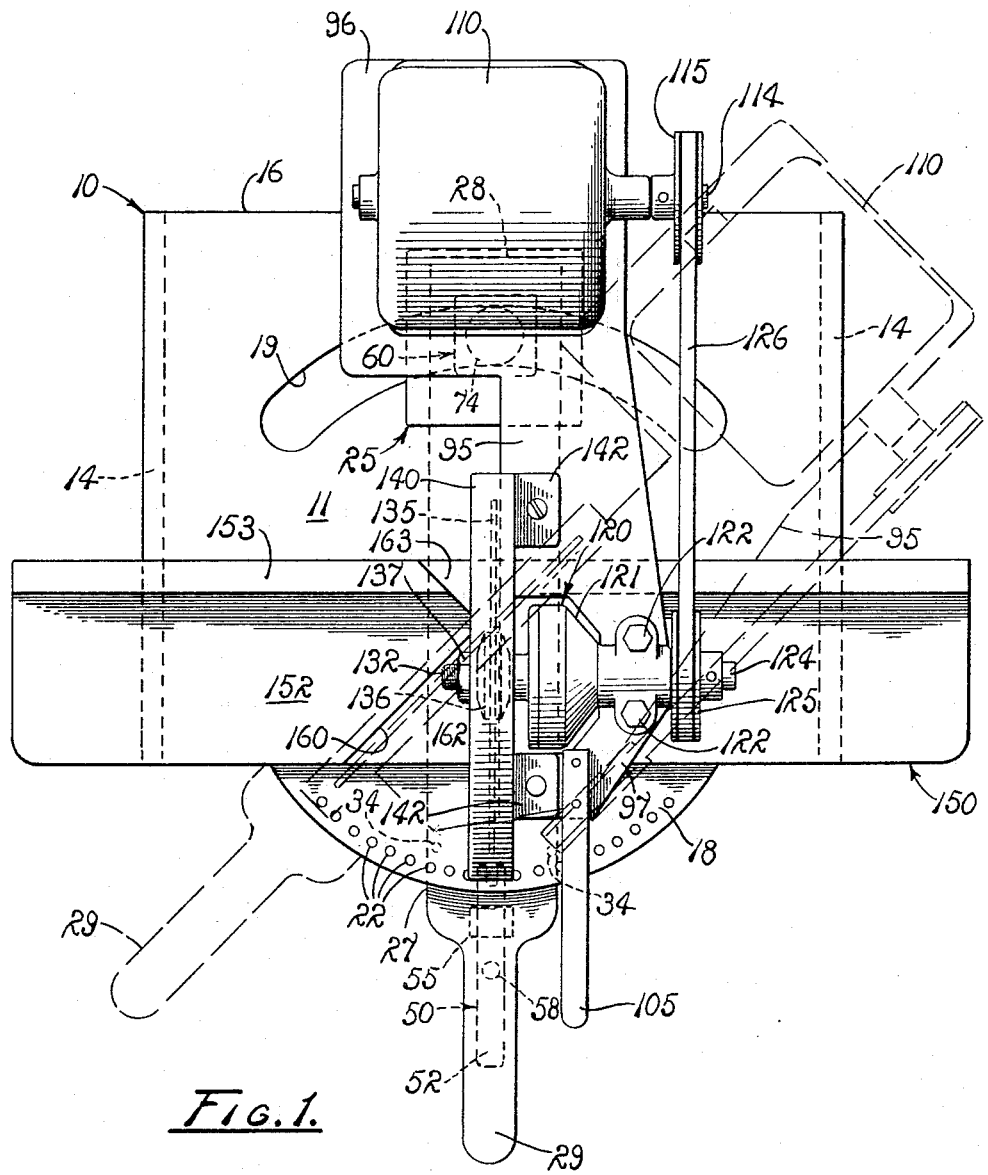
FIG. 1 is a top plan view of the power driven miter saw embodying the principles of the present invention showing the blade centered thereon in cross-cutting position in full lines and in broken lines disposed in an angular miter cutting position.

Referring more particularly to the drawings, a power driven miter saw embodying the principles of the present invention provides an inverted channeled base 10 having substantially flat upper and lower surfaces 11 and 12, respectively, and a pair of opposite depending side rails 14. The base also includes forward and rearward ends 15 and 16, respectively, and a forwardly projecting arcuate portion 18. The base further includes an arcuate slot 19 which is radially disposed from a pivot bore 20 in diametrically opposed relation from the arcuate portion 18 of the base adjacent to the rearward end 16 thereof. The arcuate portion 18 has a plurality of blade locking sockets or holes 22 disposed in equally spaced relation adjacent to the marginal edge of the arcuate portion 18 of the base. The locking holes are preferably spaced 5° apart on radial planes extended from the center of the pivot bore 20 with the outermost holes representing an included angle of 90°.

Figure 4:
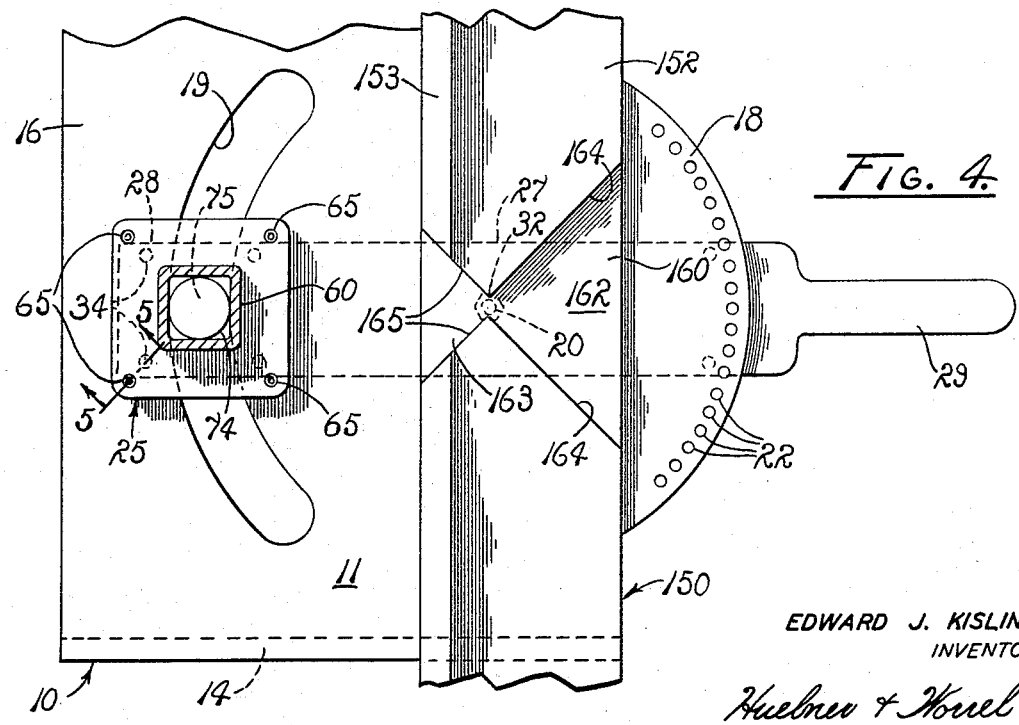
FIG. 4 is a substantially horizontal section through the miter saw, taken generally along line 4—4 of FIG. 2.

A saw arm support assembly generally indicated by the reference numeral 25 is movably mounted on the base 10. The support assembly provides a pivot arm 27 having an innerswinging end 28 within the base adjacent to the rearward end 16 thereof and an opposite outer handle end 29 extended outwardly from the forward end 15 of the base. The pivot arm is pivotally mounted intermediate its ends in substantially parallel relation to the lower surface 12 of the base by a pivot bolt and nut assembly 32 extended through the pivot bore 20 of the base. The pivot arm is spaced from the lower surface 12 of the base in freely sliding relation by a plurality of casters 34, four of which are preferably disposed in spaced rectangular arrangement as viewed in plan in FIG. 4 at the inner end 28 of the arm in sets of two on opposite sides of the arcuate slot 19. A pair of the casters are mounted in the arm inwardly adjacent to the locking holes 22 in the arcuate portion 18 of the base. As best shown in FIG. 5, each of the casters provides a threaded body 35 screw-threadably received within internally threaded bores 36 in the arm at the above described positions with the body including opposite inner and outer ends 37 and 38, respectively. The outer end of the body provides a recess 40 for receiving a suitable tightening tool such as a screwdriver, Allen wrench, or the like and the inner end rollably mounts a spherical bearing or roller 42. It is apparent that the body 35 of each of the casters is screw-threadably mounted in their respective bores 36 so that each roller 42 is freely rotationally engaged with the lower surface 12 of the base.

A handle locking mechanism generally indicated by the reference numeral 50 is mounted on the pivot arm 27 beneath the outer handle end 29. The locking mechanism includes an elongated lever or arm 52 having a gripping end 53 and an opposite locking end 54. The arm is pivotally mounted intermediate its ends on a bifurcated bracket 55 depending from the pivot arm. An elongated locking pin 57 is pivotally mounted at its lower end on the locking end of the arm and upwardly extended therefrom through the arm 52 and into the locking hole 22 with which it is aligned in the arcuate portion 18 of the base. The locking pin is normally disposed in such inserted position by a compression spring 58 mounted in a recess in the arm and extended between the arm and the outer handle end 29. It is apparent that when the handle and gripping end 53 of the locking mechanism are squeezed together, the locking pin 57 is withdrawn from the aligned locking hole 22 to free the pivot arm for ready movement relative to the base.

Figure 2:
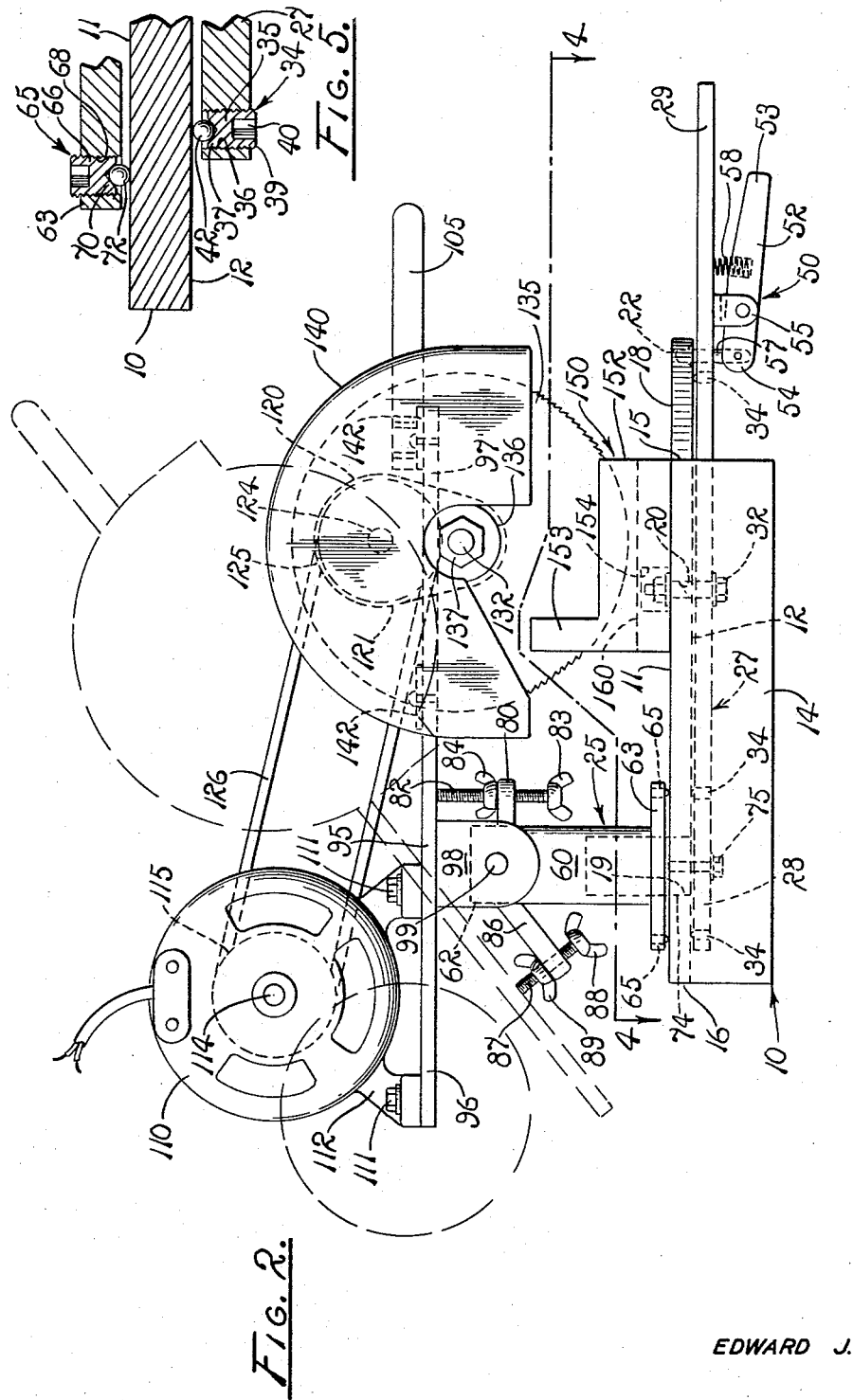
FIG. 2 is a side elevation of the miter saw of FIG. 1 with the saw blade shown in full lines lowered to a cutting position and in dashed lines shown raised to an elevated position.
Figure 3:
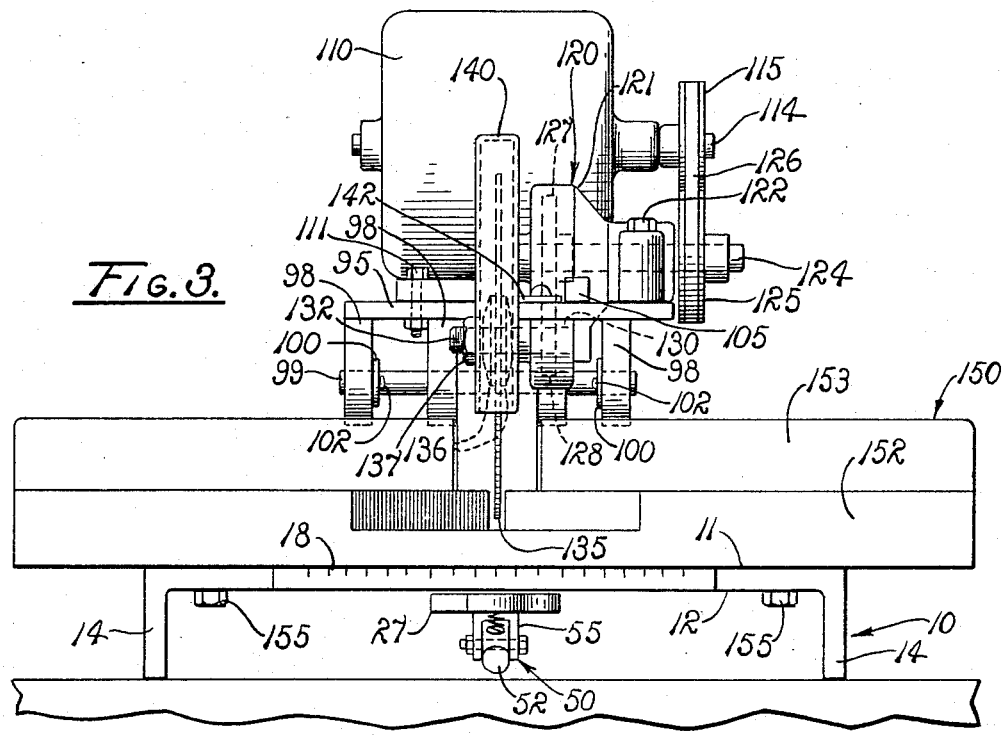
FIG. 3 is a front elevation of the miter saw shown in the cross-cutting position of FIGS. 1 and 2.

The saw arm support assembly 25 also includes a substantially upstanding pedestal 60 having an upper end 62 and a lower flanged end 63. The lower flanged end is movably mounted in closely spaced substantially parallel relation to the upper surface 11 of the base 10 by a plurality of casters 65 similar to the casters 34 in the pivot arm 27. The casters 65 individually include a threaded body 66 which is screw-threadably received within a threaded bore 68 in the flange. Each caster provides an outer drive end 69 and an opposite inner end 70 which freely rotatably mounts a spherical ball or roller 72 disposed in rolling engagement against the upper surface 11 of the base. The pedestal further includes a lower cylindrical guide portion 74 extended through the arcuate slot 19 in the base which is rigidly connected to the inner swinging end 28 of the pivot arm 27 by a cap screw 75 screw-threadably received therein. As best shown in FIG. 2, a stop screw mounting arm 80 is forwardly extended from the upper end of the pedestal. The arm 80 threadably mounts an elongated adjusting stop screw 82 having a winged head 83 and a winged nut 84 thereon tightened against the mounting arm to hold the stop screw in the desired adjusted position. A rearwardly angularly downwardly extended stop screw mounting arm 86 is mounted on the upper end 62 of the pedestal oppositely from the arm 80. An elongated stop screw 87 is screw-threadably mounted through the extended end of the mounting arm 86 and has a winged head 88 and a wing nut 89 thereon tightened against its respective mounting arm.

An elongated saw arm 95 having a rearward platform portion 96 and a forwardly disposed off-set saw blade mounting portion 97 is pivotally mounted on the upper end 62 of the pedestal 60. A plurality of depending pivot brackets 98 are mounted adjacent to the forward portion of the rearward platform of the saw arm in transversely spaced paired relation. The innermost bracket of the pairs of brackets are spaced a distance slidably to receive the upper end of the pedestal therebetween. An elongated pivot shaft 99 is extended on a substantially horizontal axis through the brackets and upper end of the pedestal. The shaft is constrained against axial movement by a pair of washers 100 and pins 102 extended through the shaft individually adjacent to the inner surfaces of the outer pivot brackets 98. An elongated handle 105 is rigidly secured to the forward blade mounting portion of the saw arm in forward extension therefrom.

An electric motor 110 is rigidly mounted on the platform portion 96 of the saw arm 95 by a plurality of cap screws 111 screw-threadably received into the platform through a plurality of motor housing legs 112. The motor includes a drive shaft 114 which mounts a pulley 115 thereon. A speed step-up gear drive mechanism generally indicated by the reference numeral 120 is mounted on the forward plate mounting portion 97 of the saw arm 95. The gear drive mechanism provides a housing 121 which is secured to the saw arm by a pair of cap screws 122. The housing rotatably mounts a drive shaft 124 which mounts a pulley 125 thereon in coplanar relation with the pulley 115.

An endless V-belt 126 is trained about the pulleys 115 and 125 in drive transmitting relation between the motor and the gear drive mechanism. The drive shaft 124, on its end opposite to the pulley 125, mounts a drive gear 127 which meshes in driving relation with a reduced diameter blade drive gear 128. The drive gear 128 is mounted on or may be alternatively formed integrally with a saw blade arbor 130 outwardly extended from the housing which terminates in a screw-threaded end 132. The arbor mounts a circular saw blade 135 and a pair of washers 136 disposed on opposite sides of the blade in non-sliding relation therewith. The blade and washers are held in such position by a lock nut 137 on the outer end of the arbor. As best shown in FIG. 1, the blade is disposed in a plane which passes through the vertical axis of the pivot bolt and nut assembly 32 about which the pivot arm 27, saw arm 95, and blade are rotated. A cover 140 is mounted on the forward blade mounting portion 97 of the saw arm 95 by a pair of integral brackets 142 which are either riveted, bolted, or secured by welding or the like to the arm.

An elongated miter box 150, for receiving and holding workpieces, not shown, is mounted on the upper surface 11 of the base 10 adjacent to the forward end 15 thereof beneath the saw blade 135. The miter box is disposed in a predetermined plane of reference substantially normal to the plane of the blade 135 when the blade is disposed in its centered position, as shown in full lines in the drawings. The miter box includes a bottom portion 152 and an upstanding backing portion or fence 153. A recess 154 is formed in the bottom portion of the miter box to receive the upper end of the pivot bolt and nut assembly 32 with the miter box constrained in such position by a plurality of cap screws 155 extended through the base. The miter box further includes a centrally disposed saw blade slot 160 having a forwardly disposed portion 162 in the bottom portion of the miter box and a rearward portion 163 partially within the bottom portion of the miter box and through the backing portion 153 thereof. The forward portion of the slot includes angularly related opposite sides 164 and the rearward portion of the slot provides opposite angularly related sides 165. Each set of sides outwardly diverges from the vertical axis of the pivot bolt and nut assembly 32, as viewed in plan, with the sides 164 of the forward portion radially extending from the axis through the center of the endmost locking holes 22 in the arcuate portion 18 of the base 10.

OPERATION

The operation of the described embodiment of the subject invention is believed to be clearly apparent and is briefly summarized at this point. With the saw blade 135 disposed in its centered position, as shown in full lines in the drawings, the lock pin 57 of the locking mechanism 50 is extended into the center locking hole 22 in the arcuate portion 15 of the base 10. In such position, squared end cross cuts may be made in workpieces disposed on the miter box 150. Normally, the counterbalancing effect of the electric motor 110 causes the rearward platform portion 96 of the saw arm 95 to be lowered against the stop screw 87 when the saw is not in use. Such position can be easily adjusted for positioning the lower periphery of the saw blade relative to the workpiece so as to provide the desired clearance therebetween by loosening the wing nut 89 and manipulating the winged head 88 of the stop screw 87. After adjustment, the wing nut is again tightened to maintain such adjusted position. A workpiece is positioned on the miter box and squared by holding the workpiece against the backing portion 153 thereof in precise right angular relation to the plane of the saw blade. The motor 110 is actuated by turning on a switch, not shown, to provide a flow of electric current thereto rotationally to drive the saw blade at approximately twice the motor speed through the pulleys 115, 125, the V-belt 126, and the gear drive mechanism 120. The operator then grasps the handle 105 and applies a downward force thereon to lower the saw blade against the workpiece for making the desired saw cut therethrough. The depth of cut may be readily adjusted by loosening the wing nut 84 and manipulating the winged head 83 of the stop screw 82. After the cut is completed, the downward force imposed by the operator through the handle 105 is relieved so that the counterbalancing effect of the motor 110 automatically returns the saw blade to its elevated position as shown in dashed lines in FIG. 2.

In order to perform a miter cut in a workpiece, the plane of the blade 135 may be disposed in a variety of angular positions with respect to the predetermined plane of reference of the miter box which remains stationary on the base. This is easily accomplished by imposing a squeezing force between the arm 52 of the handle locking mechanism and the handle end 29 of the pivot arm 27. The resulting movement of the gripping end 53 of the arm toward the handle causes the locking pin 57 to be withdrawn from the center locking hole 22 in the arcuate portion 18 of the base 10. With continued squeezing of the gripping end 53 of the arm, the pivot arm 27, pedestal 60, and saw arm 95 are free to be rotated about the axis of the pivot bolt and nut assembly 32 with a minimum of frictional drag by the rolling action of the plurality of casters 34 and 65. Such angular movement is permitted through an arc of 90°; 45° on each side of the center locking hole 22. During such movement, the plane of the blade always remains aligned with the vertical axis of rotation of the pivot arm, saw arm, and blade which movement is accommodated by the forward and rearward portions 162 and 163 of the saw blade slot 160 in the miter box 150.

In view of the foregoing, it is readily apparent that the structure of the present invention provides an improved power driven miter saw which enables the saw blade to be quickly and easily angularly adjusted with respect to the fixed plane of the miter box. The blade is automatically locked in any of its adjusted positions and is counterbalanced in a unique manner by the drive motor so as always to be urged automatically outwardly from the cutting area for ease and safety of operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A power driven miter saw comprising a base having an arcuate slot therein; a miter box rigidly mounted on the base in a predetermined plane of reference and having a centrally disposed saw slot therein; a saw arm support assembly including a lower plate rotationally mounted beneath the base on a substantially vertical axis concentric with said slot in the base, and a substantially upright pedestal movably mounted on the base providing a depending guide portion extended through said slot in the base for connection to said lower plate; caster means on said lower plate and on said pedestal providing substantially frictionless movement against their respectively adjacent portions of the base; a saw arm having predetermined forward and rearward ends mounted at its rearward end on said pedestal for pivotal movement about a substantially horizontal axis; a saw blade rotatably mounted on said forward end of the arm above said miter box in a plane substantially normal to said plane of reference of the miter box with the plane of the blade passing through said axis of the lower plate of the support assembly and through said slot in the miter box to permit angular positioning of the blade with respect to said plane of reference; interlock means mounted on said lower plate selectively engageable with the base automatically releasably to hold said lower plate and the blade in said angularly adjusted positions; and motor means mounted on said rearward end of the arm having driving connection to said blade and being substantially heavier than said saw blade and said forward end of the arm so as normally gravitationally to lower said rearward end of the arm, about said horizontal axis concurrently to raise the forward end thereof and the blade upwardly away from said miter box.

2. A power driven miter saw comprising a base having predetermined forward and rearward ends, an arcuate slot adjacent to said rearward end and an opposite forwardly projecting arcuate portion providing a plurality of holes therethrough disposed in equally spaced arcuately arranged relation; a miter box rigidly mounted on the base in a predetermined plane of reference and having a centrally disposed saw slot; a saw arm support assembly including a lower pivot arm mounted for rotation beneath the base on a substantially vertical axis concentric with said slot and said holes in the arcuate portion of the base, and a substantially upright pedestal mounted on the base providing a depending guide portion extended through said slot in the base for connection to said pivot arm, said pivot arm including an elongated handle portion outwardly extended from said arcuate portion of the base; a saw arm having predetermined forward and rearward ends mounted at its rearward end on said pedestal for pivotal movement about a substantially horizontal axis; a saw blade rotatably mounted on said forward end of the arm above said miter box in a plane substantially normal to said plane of reference of the miter box with the plane of the blade passing through said axis of the pivot arm and through said slot in the miter box to permit angular positioning of the blade with respect to said plane of reference; motor means mounted on said rearward end of the arm having driving connection to said blade; and a locking mechanism mounted on said handle portion of the pivot arm including a gripping portion and an opposite locking portion insertable into a selected one of the holes in said arcuate portion of the base and being retractable therefrom incident to manipulation of the gripping portion and handle portion of the pivot arm angularly to position the blade with respect to said plane of reference of the miter box with said locking portion being automatically reinsertable in a corresponding selected hole in the arcuate portion of the base to constrain the base in said selected angular position.

3. The power driven saw of claim 1 in which said locking mechanism comprises an elongated locking lever having a gripping end and an opposite locking end pivotally mounted intermediate its ends beneath the handle portion of said pivot arm with said locking end disposed in underlying relation to said arcuate portion of the base, an elongated locking pin pivotally mounted on said locking end of the lever and upwardly extended therefrom through said pivot arm and into a selected one of said holes in the arcuate portion of said base to constrain said saw arm support assembly against rotation and being retractable from said hole to permit rotation of the saw arm support assembly incident to gripping of said handle portion of the pivot arm and manipulation of said gripping end of the lever, and a compression spring disposed between said pivot arm and said gripping end of the lever continually to urge said locking pin toward and into the selected one of said holes.

4. The power driven saw of claim 3 in which said base has substantially flat upper and lower surfaces, and a plurality of sets of ball-type casters mounted in opposed relation on said pedestal and said pivot arm in rolling engagement with said upper and lower surfaces, respectively, of the base.

References Cited by the Examiner

UNITED STATES PATENTS

| | | | |
|---|---|---|---|
| 1,481,569 | 1/1924 | Tannewitz | 143—6 |
| 3,026,917 | 3/1962 | Schwartz | 143—6 |
| 3,105,528 | 10/1963 | Loughridge | 143—6 |
| 3,139,124 | 6/1964 | Hoff | 143—6 |

DONALD R. SCHRAN, *Primary Examiner.*